UNITED STATES PATENT OFFICE.

VIGGO VALDEMAR JULIUS ANDRESEN, OF COPENHAGEN, DENMARK.

DENTAL PREPARATION AND METHOD OF MAKING THE SAME.

1,318,254.     Specification of Letters Patent.     Patented Oct. 7, 1919.

No Drawing.     Application filed July 21, 1917. Serial No. 182,009.

*To all whom it may concern:*

Be it known that I, VIGGO VALDEMAR JULIUS ANDRESEN, a subject of the King of Denmark, and residing at Copenhagen, Denmark, have invented certain new and useful Improvements in Dental Preparations and Methods of Making the Same, of which the following is a specification.

The present invention has reference to improvements in the manufacture of certain dental preparations, and relates more specifically to improvements in compounds for use in detal surgery which contain eugenol in some form and formaldehyde, and the particular object of the invention is to so thoroughly combine these two substances that certain objections attaching to their employment in the prior form of simple mixture are effectively obviated.

As well known in the art repeated attempts have been made to use the colorless oil of spicy odor and burning taste contained in oil of cloves, oil of bay, and other oils, and known as eugenic acid or eugenol ($C_{10}H_{12}O_2$), in association with formaldehyde, with the idea of thus obtaining in one preparation the combined good effects of these two substances. But experience has definitely proved that such simple mixture often has unpleasant after-effects and is apt to cause the patient considerable pain.

I now have found that these disadvantages are effectively done away with by chemically compounding the eugenol and the formaldehyde, instead of simply mechanically mixing them in cold state as in the prior practice, and I can cause this chemical reaction to take place in different ways.

I heat, for instance, about 2 to 5 parts of eugenol (either pure or in the form of oil of cloves or the like oils) and 1 part of formaldehyde (paraformaldehyde, formalin, and the like) in an open vessel or in an autoclave to about 110–125° Celsius, when a brisk reaction will result, which ends on cooling with a jelly-like mass being produced. Or I can heat the formaldehyde by itself and introduce the resulting vapors into the eugenol, where their condensation causes a similar reaction to take place.

Again, I may bring about the condensation in the presence of other substances, such as for instance alum, and I have found a serviceable reaction-compound to be composed of 2 parts of formaldehyde, 15 parts of oil of cloves, and 15 parts of burnt alum.

The jelliform or pasty product of reaction, obtained in the described manner, can then be worked-up with a suitable quantity of zinc oxid to form a putty-like preparation, and I have found that a suitable proportion of the zinc oxid is from 30 to 50 parts of the total.

The preparation has been found efficacious for use in the treatment of teeth and cavities thereof to be filled and results in a dentin desensitizing, exiccating and sterilizing temporary hydraulic cement, which can be applied to the most inaccessible places in teeth, owing to the fact that the tooth or cavity need not be dried previous to the application of the said cement, as the said cement hardens either in the air or under water.

It has been found in practice that in the treatment of the teeth of children or delicate persons, the first cement applied may be dipped in cocain or orthoform powder, so that a few crystals remain on the surface which come in direct contact with the dentin.

What I claim is:—

1. The method of making a dental preparation which consists in subjecting formaldehyde, eugenol, and alum to heat reaction, until the formaldehyde combines with the eugenol, allowing the result jelly like mass to cool and adding zinc oxid to form a paste.

2. The method of making a dental preparation which consists in subjecting two parts of formaldehyde solution of 40% strength, fifteen parts of oil of cloves, and fifteen parts of burnt alum to heat reaction until the formaldehyde condenses with the eugenol, allowing the resultant jelly like mass to cool and finally working it up with an addition of 30–50 parts of zinc oxid into a stiff paste.

In testimony whereof I affix my signature.

VIGGO VALDEMAR JULIUS ANDRESEN.